Sept. 1, 1959  J. C. DAESCHNER  2,902,301
SHAFT SEAL

Filed July 19, 1955  2 Sheets-Sheet 1

INVENTOR.
JOHN C. DAESCHNER
BY
AGENT

Sept. 1, 1959 J. C. DAESCHNER 2,902,301
SHAFT SEAL

Filed July 19, 1955 2 Sheets-Sheet 2

*INVENTOR.*
JOHN C. DAESCHNER
BY
*AGENT*

United States Patent Office  2,902,301
Patented Sept. 1, 1959

2,902,301

SHAFT SEAL

John C. Daeschner, Clinton, Ind., assignor, by mesne assignments, to Olin Mathieson Chemical Corporation, a corporation of Virginia Application July 19, 1955, Serial No. 522,970

9 Claims. (Cl. 286—8)

This invention relates generally to shaft seals and more particularly to a means for lubricating, flushing and cooling the matching surfaces of a mechanical shaft seal.

The rotary shaft of a pump is frequently provided with a mechanical seal which prevents the liquid being pumped from backing up around the pump shaft. Such a seal is composed of a collar mounted on the shaft and rotating therewith and a stationary bushing within the pump's stuffing box. The face of the collar and the adjacent face of the bushing are matched to produce an air tight seal. Seals of this type may be used to advantage in most pumps but it has been found that if the liquid being pumped is a solution, the solute may crystallize on the matching surfaces and erode them to the point the seal is destroyed. Moreover, if the solute is an explosive such as cyclonite any crystals thereof between the matching surfaces of the seal may explode.

It is therefore an object of this invention to provide a novel shaft seal. Another object is to provide an improved mechanical seal for rotary shafts. A more specific object of the invention is to provide a pump seal having a rotating member pressed in sealing relationship with the face of a stationary bushing which is provided with a means for carrying a liquid to the matching surfaces of the rotating member and bushing.

Other objects will become apparent from the following description taken in connection with the accompanying drawing in which.

In accordance with this invention, the objects thereof are accomplished generally speaking, by providing the rotary shaft of a pump with a mechanical seal having a means for continuously flushing the matching surfaces or matching faces of the members forming the seal with a solvent for the solute in the solution being handled. More specifically, the invention contemplates a gland or bushing within the stuffing box of a pump having a novel series of ports and grooves adapted to carry a liquid to the matching or mating faces of the members of a mechanical seal of a rotary shaft. The bushing should preferably form a press fit with the wall of the stuffing box. The mechanical seal is formed by pressing the face of the rotary half thereof mounted on the shaft into sealing relationship with the face of the stationary bushing. The bushing may be formed from any suitable material which is resistant to chemical action by the liquid circulated therethrough. The liquid passes through the bushing to a groove in the face thereof and against the surface of the rotating member and then passes along the shaft into the pump. Any solution which backs up around the shaft or between the faces of the seal is diluted by the liquid in the bushing and crystallization is prevented or if it should occur the crystals are dissolved and the resulting solute is carried back into the pump.

Figure 1:
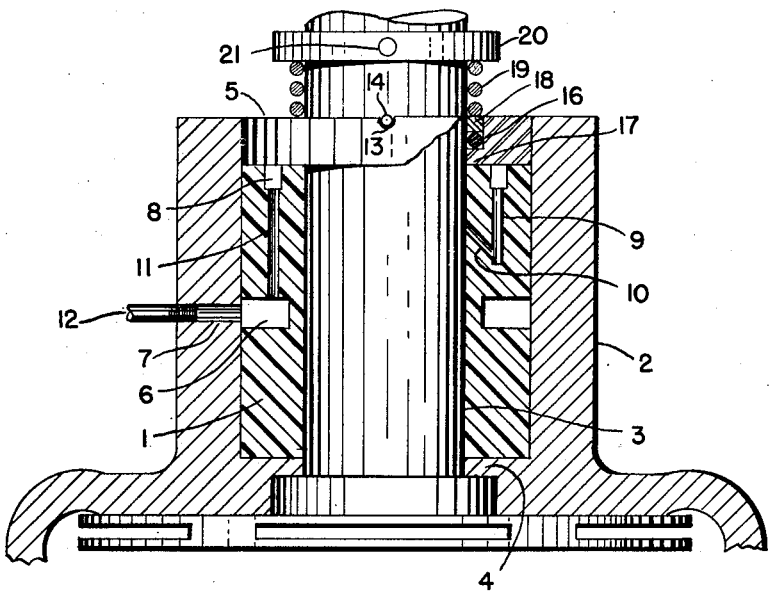
Figure 1 is a longitudinal sectional view along the line A—A of Figure 3, showing the stuffing box of a pump illustrating an embodiment of this invention.
Figure 2:
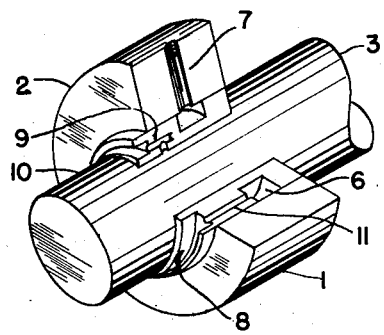
Figure 2 is a perspective view, partially in section, of the bushing shown in Figure 1.
Figure 3:
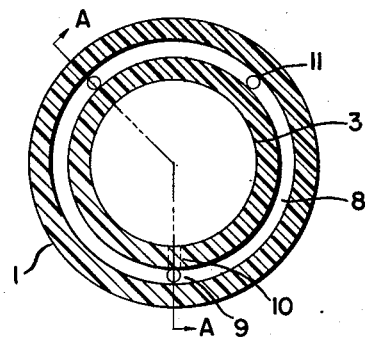
Figure 3 is a cross section of the bushing of Figure 2.

In order better to describe and further clarify the invention the following is a detail description of preferred embodiments thereof with reference to the accompanying drawing:

The rotary shaft seal shown in Figure 1 is composed of a bushing 1 encased in pump housing 2 and about rotary shaft 3. Bushing 1, which may be plastic, rubber, resin, or the like depending upon its resistance to the liquid, rests on annular lip 4 of housing 2 and the face thereof is pressed against the inner face of collar 5 mounted on shaft 3 forming a seal therewith. Collar 5 is provided with U-shaped slot 13 around pin 14 of shaft 3 in order that collar 5 will rotate. Rubber O-rings 16 is pressed against flange 17 of collar 5 by means of ring 18. O-ring 16 forms a press fit with shaft 3. Collar 5 is urged towards the surface of bushing 1 by spring 19 which is backed by collar 20 fastened to shaft 3 by pin 21. The outside diameter of bushing 1 is greater than the inside diameter of housing 2. An annular groove 6 is formed in the outer surface of bushing 1 and registers with a radial port 7 through housing 2 provided with threads adjacent the outer wall of housing 2 in order that it can be connected with a suitable pipe 12 or other source of liquid. A second annular groove 8 is provided in the face of bushing 1 lying against the interior face of collar 5. As illustrated in Figure 1, in this particular embodiment, the annular groove is centrally located between the two walls of the bushing 1. As illustrated in Figures 1, 2 and 3, two axial ports 11 extend from annular groove 6 to annular groove 8. Another axial port 9 extends between annular groove 8 and a radial port 10 communicating with the annular space lying between the shaft 3 and bushing 1. In operation a suitable liquid is pumped through a suitable conduit means into radial port 7. This solution fills annular groove 8, axial ports 11, axial port 9 and radial port 10. The solution emerges from the bushing through port 10 and flows about shaft 3 to the pump. The solution within groove 8 lubricates, flushes and cools the face of the collar 5 and the face of bushing 1.

Figure 4:
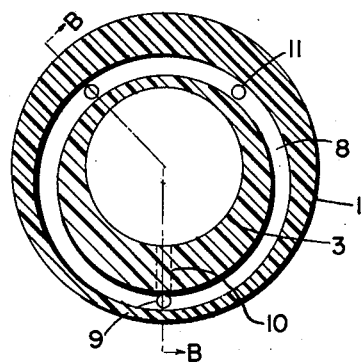
Figure 4 is a cross sectional view of another embodiment of the invention.
Figure 5:
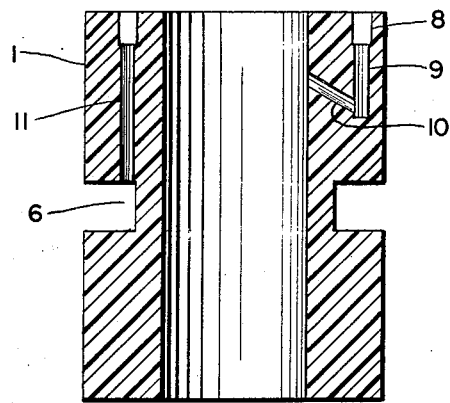
Figure 5 is a longitudinal sectional view taken along the line B—B of Figure 4.

In the embodiment shown in Figures 4 and 5, annular groove 8 is eccentric. This embodiment is otherwise similar to that shown in Figures 1, 2 and 3 having the annular groove 6 registering with a suitable radial port such as 7 of Figure 1, a pair of ports 11 communicating with groove 6, an axial port 9 communicating with a radial port 10 which discharges about shaft 5. The operation with this embodiment is essentially the same as that with the above described embodiment with the solution flowing through the ports and into the grooves as described above. This type of bushing having the eccentric groove in the face thereof is particularly advantageous, however, since it permits flushing, cooling and lubricating of the mechanical sealing collar 5 over a greater area thereof and will extend the life of the unit.

Figure 6:
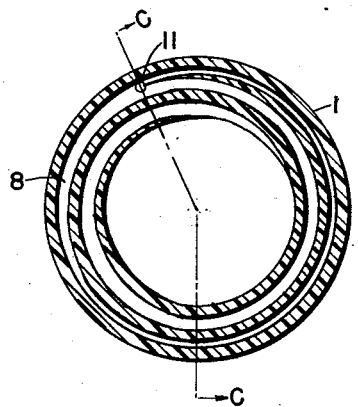
Figure 6 is a cross sectional view of another embodiment of the invention.
Figure 7:
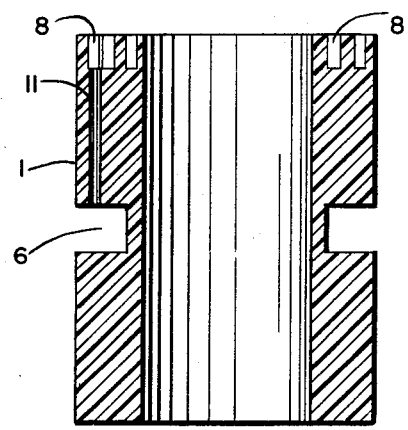
Figure 7 is a longitudinal sectional view taken along the line C—C of Figure 6.

The embodiment illustrated in Figures 6 and 7 is substantially identical to the bushing of Figure 1 with the exception that groove 8 adjacent the face of the collar 5 mounted on shaft 3 is a spiral groove terminating at the inner wall of the bushing and permits the solution to be discharged directly from groove 8 about shaft 3. As shown in Figures 6 and 7 this embodiment is provided with the annular groove 6 which registers with a radial port 7 of Figure 1, and axial ports 11. The ports 9 and 10 obviously are not required in this embodiment. This embodiment because of the spiral groove is also particularly advantageous because it permits flushing, cooling and lubricating over the entire inner face of collar 5. This type of bushing is particularly well suited for use in pumps which are utilized in conjunction with slurries or suspensions of solid materials in a liquid. The shaft should preferably turn clockwise with respect to the bushing as it is illustrated in Figure 7.

In each of the foregoing embodiments the matching faces of the bushing 1 and collar 5 are ground until perfectly flat to insure a good seal. It is also to be noted that the flow of liquid through the bushing and about the rotary shaft effects a liquid seal which augments the seal formed by the matching faces. The rotary half of the mechanical seal, collar 5, is shown in the drawings within the stuffing box but in some embodiments it is preferably outside the stuffing box. Any other suitable means for attaching the rotating collar to the shaft may be utilized.

It has been found that the rotary shaft seal provided by this invention is particularly advantageous for pumps utilized with solutions of cyclonite and acetone. A bushing made from a tetrafluoroethylene polymer plastic has been found particularly resistant to such solutions. "Teflon" manufactured and sold by the E. I. du Pont de Nemours Corporation is suitable for the purpose. Substantially pure acetone is pumped from a suitable source through the bushing 1 of the pump and prevents crystallization of the cyclonite from any solution thereof which backs up around rotary shaft 3 or dissolves any crystals which may form due to the cooling of the solution. In this way erosion of the faces of the mechanical seal formed by collar 5 and the face of bushing 1 is avoided.

A pump embodying this invention is of course suitable for pumping solutions other than a solution of cyclonite and acetone and the seal can be used with any rotating shaft such as an agitator, if desired. Such a pump may be used to advantage in pumping any solution provided the bushing is formed from a material which is resistant to any chemical activity by the liquid to be used for flushing the face of the mechanical seal.

Although embodiments of the invention have been described in considerable detail in the foregoing for the purposes of illustration, it is to be understood that such detail is solely for the purpose of illustration and that many modifications can be made by those skilled in the art without departing from the scope of the invention.

I claim:

1. In a shaft seal, a housing having a radial port therein, a rotary shaft extending into the housing and having a collar fastened thereto, a stationary bushing in sealing contact with the interior of the housing and collar, and in closely spaced relationship with said shaft forming an annular liquid passageway therebetween, said bushing comprising an annular groove adjacent the interior wall of said housing and registering with the radial port therein, a second annular groove in the face of the bushing adjacent said shaft collar, an axial port extending between the said annular grooves, and a passageway extending from the second annular groove through the bushing and to the rotary shaft.

2. In a shaft seal, a housing having a radial port therein, a rotary shaft extending into the housing and having a collar mounted thereon, a stationary bushing of tetrafluoro-ethylene in sealing contact with the interior of the housing and collar, and in closely spaced relationship with said shaft forming an annular liquid passageway therebetween, said bushing comprising an annular groove adjacent the interior wall of said housing and registering with the radial port therein, a second annular groove in the face of the bushing adjacent said shaft collar, an axial port extending between the said annular grooves, and communicating means between the second annular groove and the annular liquid passageway between the bushing and rotary shaft.

3. In a shaft seal, a housing having a radial port therein, a rotary shaft extending into the housing and having a collar mounted thereon, a stationary bushing forming a press fit with the interior of the housing and collar, and in closely spaced relationship with said shaft forming an annular liquid passageway therebetween, said bushing comprising an annular groove adjacent the interior wall of said housing and registering with the radial port therein, a second annular groove in the face of the bushing adjacent said shaft collar, axial ports extending between the said annular grooves, and a liquid passageway between the second annular groove and the annular liquid passageway between the bushing and rotary shaft, and means for conducting liquid under pressure through the radial port in the housing into said grooves and ports in the bushing.

4. In a shaft seal, a housing having a radial port therein, a rotary shaft extending into the housing and having a collar mounted thereon, a stationary bushing in sealing contact with the interior of the housing and having a face in sealing engagement with said collar, said bushing being in closely spaced relationship with said shaft forming an annular liquid passageway therebetween, said bushing comprising an annular groove adjacent the interior wall of said housing and registering with the radial port therein, a second annular groove in the face of the bushing adjacent said shaft collar, axial ports extending between the said annular grooves, and a liquid passageway between the second annular groove and the said annular liquid passageway between the bushing and rotary shaft.

5. In a pump having a stuffing box and a shaft seal, a housing having a radial port therein, a rotary shaft extending into the housing and having a collar mounted thereon, a stationary bushing in sealing contact with the interior of the housing and the interior face of said collar and in closely spaced relationship with said shaft forming an annular liquid passageway therebetween, said bushing comprising an annular groove adjacent the interior wall of said housing and registering with the radial port therein, a second annular groove in the face of the bushing adjacent said shaft collar, axial ports extending between the said annular grooves, a liquid passageway between the second annular groove and the annular liquid passageway between the bushing and rotary shaft, and means for circulating liquid through the bushing and into said pump.

6. In a shaft seal, a housing having a radial port therein, a rotary shaft extending into the housing and having a collar mounted thereon, a stationary bushing in sealing contact with the interior of the housing and collar and in closely spaced relationship with said shaft forming an annular liquid passageway therebetween, said bushing comprising an annular groove adjacent the interior wall of said housing and registering with the radial port therein, an accentric annular groove in the face of the bushing adjacent said shaft collar, axial ports extending between the said annular grooves, and a liquid passageway between the eccentric annular groove and the annular liquid passageway between the bushing and rotary shaft.

7. In a shaft seal, a housing having a radial port therein, a rotary shaft extending into the housing and having a collar mounted thereon, a stationary bushing in sealing contact with the interior of the housing and collar, and in closely spaced relationship with said shaft forming an annular liquid passageway therebetween, said bushing comprising an annular groove adjacent the interior wall of said housing and registering with the radial port therein, a spiral groove in the face of the bushing adjacent said collar and terminating in communicating relationship with said annular liquid passageway between the bushing and rotary seal, axial ports extending between the annular groove and the spiral groove, and means for conducting liquid through the radial port in the housing and said grooves and ports of the bushing into said annular liquid passageways.

8. In a shaft seal, a housing having a radial port therein, a rotary shaft extending into the housing and having a collar mounted thereon, a stationary bushing in sealing contact with the interior of the housing and collar, and in closely spaced relationship with said shaft forming an annular liquid passageway therebetween, said bushing comprising an annular groove adjacent the interior wall of said housing and registering with the radial port therein, a second annular groove in the face of the bushing adjacent said shaft collar, axial ports extending between the said annular grooves, an axial port extending from said second annular groove and a radially extending port communicating between the last said port and said annular liquid passageway between the bushing and rotary shaft, and means for conducting liquid through progressively the radial port in the housing and through said grooves and ports of the bushing into said annular liquid passageways.

9. In a pump adapted for pumping a solution of an explosive, a rotary shaft, a stuffing box having a housing about the shaft and between the housing and shaft a seal comprising a collar mounted on the shaft and a stationary bushing having a face forming a mechanical seal with a surface of the collar, said bushing extending about said shaft in closely spaced relationship therewith but leaving an annular liquid passageway therebetween, an annular groove in the bushing adjacent the housing, a radial port through the housing registering with said annular groove, a second annular groove in the face of the bushing adjacent said collar, a first port extending between said grooves a second port extending from the second annular groove to the said annular liquid passageway about the rotary shaft at a point along the shaft removed from said second annular groove, means connected to said radial port for introducing liquid under pressure into the grooves and passageways in said bushing and for forcing the liquid therethrough and about the rotary shaft, thereby providing a means for forming a liquid seal between said collar and the face of said bushing and also for effecting a liquid seal between said rotary shaft and said bushing and for simultaneously flushing the annular passageway about the shaft and thereby preventing an accumulation of solid explosive material about the shaft.

References Cited in the file of this patent

UNITED STATES PATENTS

| | | |
|---|---|---|
| 1,212,089 | Miller et al. | Jan. 9, 1917 |
| 1,321,379 | Lachmann | Nov. 11, 1919 |
| 1,926,007 | Kohler | Sept. 5, 1933 |
| 2,112,461 | Kohler | Mar. 29, 1938 |
| 2,366,729 | Hanson | Jan. 9, 1945 |
| 2,467,312 | Jack | Apr. 12, 1949 |
| 2,712,461 | Batchelder | July 5, 1955 |
| 2,860,895 | Mosbacher | Nov. 18, 1958 |